US006674815B2

(12) United States Patent
Zangi

(10) Patent No.: US 6,674,815 B2
(45) Date of Patent: *Jan. 6, 2004

(54) METHOD FOR SYMBOL-SPACED ESTIMATION AND/OR TRACKING OF A FRACTIONALLY-SPACED FADING RADIO CHANNEL

(75) Inventor: Kambiz C. Zangi, Raleigh, NC (US)

(73) Assignee: Ericsson, Inc, Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 58 days.

(21) Appl. No.: 09/334,432

(22) Filed: Jun. 16, 1999

(65) Prior Publication Data

US 2003/0118092 A1 Jun. 26, 2003

(51) Int. Cl.[7] .................................................. H04B 7/00
(52) U.S. Cl. ...................... 375/340; 375/148; 375/260; 375/346; 714/796
(58) Field of Search ............................... 375/219, 229, 375/232, 262, 340, 341, 346, 348, 350, 134, 137, 144, 148, 234, 260, 347, 349; 714/794, 795, 796; 370/320, 335, 342

(56) References Cited

U.S. PATENT DOCUMENTS

| 5,263,053 A | | 11/1993 | Wan et al. | |
|---|---|---|---|---|
| 5,363,412 A | * | 11/1994 | Love et al. | 375/341 |
| 5,471,501 A | * | 11/1995 | Parr et al. | 375/354 |
| 5,513,221 A | * | 4/1996 | Parr et al. | 375/344 |
| 5,623,511 A | * | 4/1997 | Bar-David et al. | 375/143 |
| 5,680,419 A | * | 10/1997 | Bottomley | 375/347 |
| 5,805,638 A | | 9/1998 | Liew | |
| 5,818,876 A | * | 10/1998 | Love | 375/341 |
| 5,889,827 A | * | 3/1999 | Bottomley et al. | 375/350 |
| 5,903,610 A | * | 5/1999 | Skold et al. | 375/285 |
| 5,905,721 A | | 5/1999 | Liu et al. | |
| 6,084,862 A | * | 7/2000 | Bjork et al. | 370/292 |
| 6,108,517 A | * | 8/2000 | Arslan et al. | 455/21 |
| 6,134,280 A | * | 10/2000 | Matui | 375/341 |
| 6,275,523 B1 | * | 8/2001 | Chen et al. | 375/226 |
| 6,330,431 B1 | * | 12/2001 | Rostamy et al. | 455/226.1 |
| 6,345,076 B1 | * | 2/2002 | Petersen et al. | 375/341 |
| 6,347,126 B1 | * | 2/2002 | Nagayasu et al. | 375/344 |
| 6,353,913 B2 | * | 3/2002 | Huttunen | 714/796 |
| 6,445,342 B1 | * | 9/2002 | Thomas et al. | 342/367 |

FOREIGN PATENT DOCUMENTS

| EP | 0 825 727 A1 | 2/1998 |
|---|---|---|
| WO | WO 96/10879 | 4/1996 |
| WO | WO 00/41338 | 7/2000 |

OTHER PUBLICATIONS

Lee and Messerschmitt, "Generalized Equalization Methods", *Digital Communication*, Kulwer Academic Publishers (1994) pp. 464–481
Khayrallah et al., "Improved Channel Estimation with Side Information", IEEE, 0–7803–4075–2/97 (1997).
Lindbom, "Adaptive Equalization for Fading Mobile Radio Channels", Trends for the degree of Technology Degree, Polacksbacken, Uppsala (1992).

* cited by examiner

*Primary Examiner*—Young T. Tse
(74) *Attorney, Agent, or Firm*—Moore & Van Allen, PLLC; Gregory A. Stephens

(57) ABSTRACT

A method of estimating and/or tracking time varying radio channels comprises the step of receiving signals transmitted over the channels and converting the signals to digital samples for processing. Positions of fading rays of the channel medium are determined. Impulse response of a channel medium are estimated for each of the estimated positions. Estimates of the time varying radio channels are then calculated using the digital samples and the estimated impulse responses.

8 Claims, 4 Drawing Sheets

METHOD FOR SYMBOL-SPACED ESTIMATION AND/OR TRACKING OF A FRACTIONALLY-SPACED FADING RADIO CHANNEL

FIELD OF THE INVENTION

This invention relates to digital communication receivers that estimate or track multi-rate fading channels and, more specifically, to a method for symbol-spaced estimation and/or tracking of a fractionally-spaced channel.

BACKGROUND OF THE INVENTION

Digital cellular systems require equalization to handle intersymbol interference (ISI) from time dispersion or delay spread in the channel. Typically, a non-linear equalizer (e.g., maximum likelihood sequence estimator (MLSE)) is used for such channels. An estimate of the radio channel is required for this equalization. Furthermore, if the channel changes fast enough, then the equalizer must continuously track the variations in this channel. Our invention provides a novel method for estimation or tracking of such radio channels. This method is specially suited for those situations where the medium rays are spaced closer than one symboling interval.

A radio channel can be effectively broken into three parts. These are the transmit filter, which is known, the channel medium, which is unknown, and the receiver filter, which is known. The inputs to the radio channel are typically symbols from a discrete alphabet, such as +1 and −1, with a sampling rate equal to the baud rate. The transmit filter, the channel medium, and the receiver filter are typically modeled at a higher sampling rate, for example eight times the symbol rate. The equalizer uses a symbol-spaced model of the radio channel that relates the transmitted symbols to the output of the receive filter at the sampling rate of one sample per symbol period (this application refers to this symbol-spaced channel as the effective baseband channel). The reference "Digital Communication" (Lee/Messerschmitt, Kulwer Academic Publishers, 1994) presents a method for directly estimating the effective baseband channel. Similarly, the reference "Licentiate Thesis, Lars Lindbum, Upsala University 1992, ISSN 03468887) presents a method for directly tracking the effective baseband channel. However, the present invention provides an improvement over these methods when the underlying rays of the channel medium are spaced closer than one symbol period. A. Khayrallah, R. Ramesh, G. Bottomley, and D. Koilpillai, "Improved Channel Estimation with Side Information" "VTC-97, Vol.2, pp.1049–1051, presents a method for estimating fading mobile radio channels were the effective baseband channel is modeled as a convolution of a known pulse and an unknown medium. The authors only estimate the medium part of the channel explicitly, and reconstruct the effective baseband channel as a convolution of this estimated medium and the known pulse. However, as shown in the present application, the effective baseband channel cannot always be expressed as the convolution of a known pulse and an unknown medium. Specifically, the method of Khayrallah is not applicable when the channel medium has rays that are placed closer than one symbol-period (i.e., fractionally-spaced medium).

SUMMARY OF THE INVENTION

In accordance with the invention there is provided a method for symbol-space estimation or tracking of fractionally-spaced radio channels.

Broadly, there is disclosed herein the method of estimating time varying radio channels comprising the steps of receiving signals transmitted over the channels and converting the signals to digital samples for processing; determining positions of fading rays of the channel medium; estimating impulse response of a channel medium for each of the estimated positions; and calculating estimates of the time varying radio channels using the digital samples and the estimated impulse responses.

It is a feature of the invention that the fading rays are spaced closer than a transmit symbol period.

It is another feature of the invention that the radio channel estimates are provided for a GSM equalizer.

It is a further feature of the invention that the radio channel estimates are provided for a code-division multiple access equalizer.

There is disclosed in accordance with another aspect of the invention a channel estimator adapted to track time varying radio channels including means for receiving signals transmitted over the channels, and converting the signals to digital samples for processing. Means are provided for determining positions of fading rays of the channel medium. Means estimate impulse response of a channel medium for each of the estimated positions. Means are provided for calculating estimates of the time-varying radio channel using the digital samples and the estimated impulse responses of the medium.

Further features and advantages of the invention will be readily apparent from the specification and from the drawing.

DETAILED DESCRIPTION OF THE INVENTION

The invention relates to a method of symbol-spaced estimation and tracking of a fractionally-spaced fading radio channel. This can be used by any digital communication equalizer that needs to estimate or track a multi-ray fading channel such as a Typical Urban channel of the Global System for Mobile Communication (GSM). Using this tracking method, the block error rate (BLER) of current design GMS/GMSK equalizers can be improved by 4 dB (Eb/NO) at 10% BLER with coding rate of 0.73 at 120 kilometers per hour.

The disclosed method can also be used in code-division multiple access (CDMA) systems to estimate or track the fading rays for use with rake fingers. For example, the method can be used by a CDMA finger searcher to find the rake fingers, assuming that the medium rays are spaced closer than one sampling period used to digitize the output of the radio channel.

Figure 1:
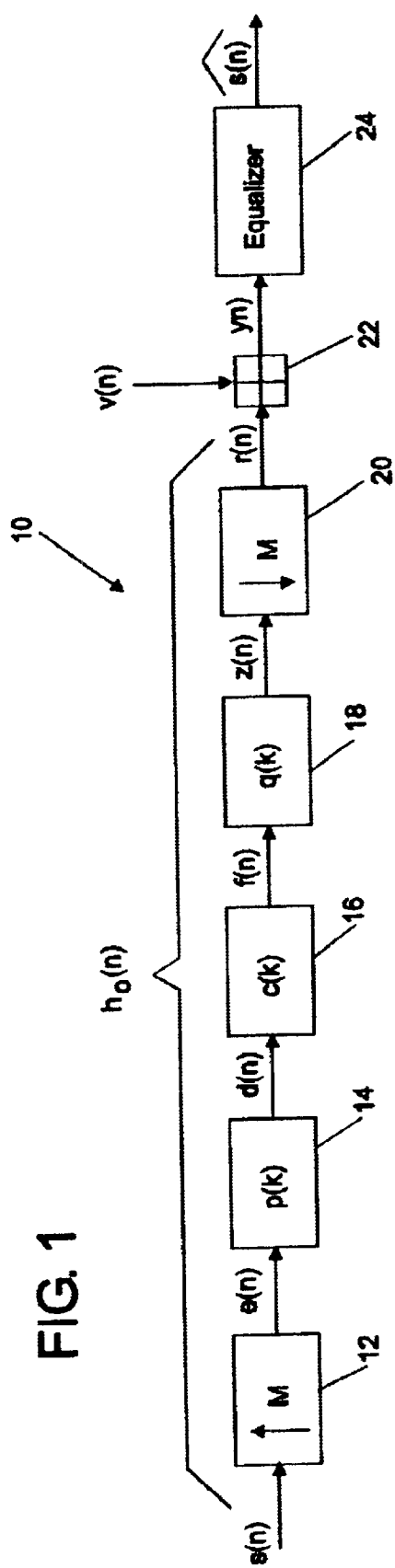
FIG. 1 is a block diagram of a digital communication system.

Referring to FIG. 1, a block diagram illustrates a discrete-time model of a digital communication system 10. The digital communication system is modeled at baseband. The signal s(n) represents transmitted symbols. A block 12 takes the transmitted symbols and upsamples these symbols from one sample per symbol to M samples per symbol to produce a signal e(n) (i.e., block 12 inserts "M−1" zeros between each consecutive pair of samples of s(n)). The block 12 is connected to a transmit filter 14 represented by impulse response p(k). The output of the transmit filter 14, represented by d(n), is transmitted through the channel medium block 16. The sequence c(k) represents the impulse response of the channel medium, which produces an output represented by f(n). A receiver includes a receive filter 18 represented by q(k) which produces an output z(n). The output of the receive filter 18 is coupled to a sample rate converter 20 which downsamples from M samples per symbol to 1 sample per symbol. The output, r(n), of the downsampler 20 is summed in a summer 22 with signal v(n) representing white Gaussian noise (AWGN) to produce an output y(n). This output is supplied to an equalizer 24 which produces estimated symbols ŝ(n). The AWGN should be added before the receive filter 18 and downsampling. However, if the receive filter 18 is flat over the bandwidth of the communication system, then adding the AWGN at the output of the downsampler 20 results in the same input to the equalizer.

With respect to the channel medium 16, c(j) represents a multipath ray with delay jT (1/T is the highest sampling frequency in the model of the digital communication system). Assuming that T is small enough, the c(k)'s can accurately model the continuous-time medium. With a few rays, c(k) has only a few non-zero coefficients. In the model of FIG. 1, p(k), c(k), and q(k) operate with a sampling frequency $$\frac{1}{T}.$$

S(n) and r(n) operate at the lower sampling frequency of $$\frac{1}{MT}$$

(i.e., they operate at the symbol rate). In the transmitter, a new symbol s(n) is modulated every MT seconds using the transmit filter 14. As a result:

$$d(n) = \sum_k s(k)p(n - Mk). \quad (1)$$

Each symbol of s(n) belongs to a discrete alphabet.

Figure 2:
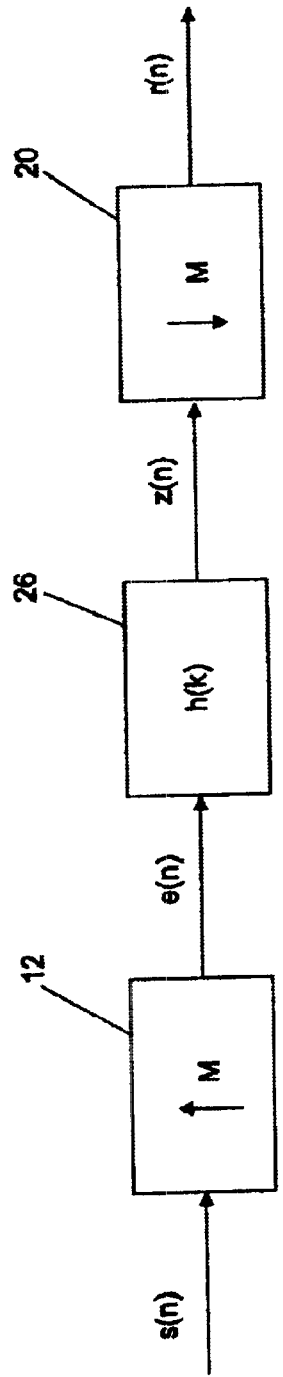
FIG. 2 is a block diagram of an effective radio channel of the system of FIG. 1.

The present invention utilizes several properties of the communications system 10 of FIG. 1. One property of the system 10 is that for any p(k), c(k), and q(k) the system with an input signal s(n) and output signal r(n) is linear time invariant (LTI). Specifically, $$r(n) = \sum_k h_0(k)s(n - k), \quad (2)$$

where $h_0(k) = h(MK)$ with $h(k) = p(k)*c(k)*q(k)$. FIG. 2 illustrates a block diagram of the effective baseband channel where blocks 14, 16 and 18 of FIG. 1 are modeled with a block 26 representing the function h(k). It can be seen that z-transform of e(k), z(k), and r(k) are related as:

$$E(z)=S(z^M) \quad (3)$$

$$Z(z)=S(z^M)H(z) \quad (4)$$

$$R(z)=[S(z^M)H(z)]\downarrow_M \quad (5)$$

$$=S(z)H_0(z), \quad (6)$$

where in going from equation (5) to equation (6), the first Nobel Identity is used from P. P. Vaidyanathan, "Multirate Systems and Filter Banks," Prentice Hall, 1992. The function $h_0(n)$ is referred to herein as the effective baseband channel. An estimate of $h_0(n)$ is denoted by $\hat{h}_0(n)$, which is used by the equalizer 24 to compute ŝ(n).

The second property is that r(n) is a linear function of each tap of the medium channel. Specifically, if $r_i(n)$ is the output sequence resulting from $s(k)=\delta(n)$ and $c(n)=\delta(n-i)$, the symbol-spaced channel $h_0(n)$ can be expressed as $$h_0(n) = \sum_i r_i(n)c(i). \quad (7)$$

Using equation (7), r(n) can be written as $$r(n) = s(n) * h_0(n) \quad (8)$$

$$= s(n) * \sum_i r_i(n)c(i) \quad (9)$$

$$= \sum_i \{r_i(n) * s(n)\}c(i) \quad (10)$$

$$= \sum_i g_i(n) \times c(i), \quad (11)$$

where $g_i(n) \equiv r_i(n)*s(n)$.

Figure 3:
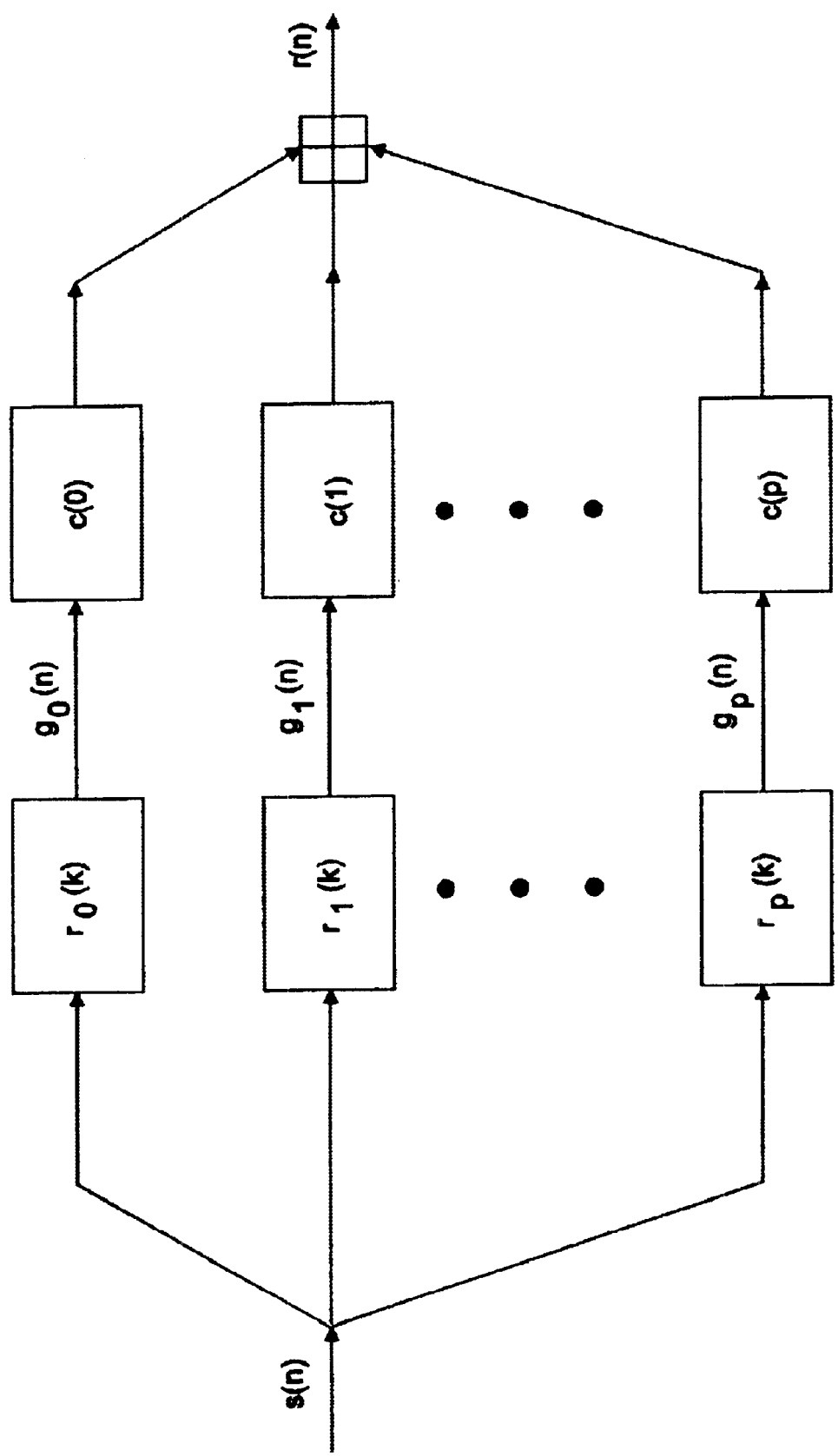
FIG. 3 is a block diagram of the symbol-spaced radio channel in accordance with the invention.

Assuming that c(i)=0 for i>P, equation (11) can be expressed in block diagram form as in FIG. 3.

As is apparent, FIGS. 1 and 3 are two different representations of the same LTI system having input signal s(n) and output signal r(n). In FIG. 1, different portions of the model operate at different sampling rates, as discussed above. In the representation of FIG. 3, all parts of the model operate at the sampling frequency of 1/(MT), which is the symbol rate (i.e., the baud rate).

For equalization, each tap of $h_0(k)$ needs to be estimated and/or tracked. Direct estimation or tracking of taps $h_0(k)$'s is complicated. However, estimation or tracking of c(k)'s is relatively simple. Different taps of $h_0(k)$'s are typically correlated with each other, and this correlation needs to be included in any good estimator of these taps. On the other hand, different taps of c(k) are independent; hence, the correlation among c(k)'s is not needed by an estimator of c(k)'s.

Because the statistical model for c(k)'s is relatively simple, in accordance with the invention, $h_0(k)$'s are estimated indirectly. This is done by first estimating each c(k), denoted by ĉ(k), and then equation (7) is used to obtain $\hat{h}_0(n)$ as:

$$\hat{h}_0(n) = \sum_i r_i(n)\hat{c}(i). \quad (12)$$

To estimate $h_0(n)$'s, estimates are first obtained of the fading rays, ĉ(n)'s, and then form the estimate of the baseband channel according to equation (12).

To obtain $\hat{c}(i)$'s, first recall that $$y(n) = r(n) + v(n) \quad (13)$$

$$= \sum_i g_i(n) \times c(i) + v(n), \quad (14)$$

where in going from (13) to (14), equation (11) is used. Next, equation (14) is expressed in matrix form as:

$$\begin{bmatrix} y(0) \\ y(1) \\ \vdots \\ y(N) \end{bmatrix} = \begin{bmatrix} \vdots & \vdots & \vdots & \vdots \\ g_0 & g_1 & \cdots & g_P(n) \\ \vdots & \vdots & \vdots & \vdots \end{bmatrix} \begin{bmatrix} c(0) \\ c(1) \\ \vdots \\ c(P) \end{bmatrix} + \begin{bmatrix} v(0) \\ v(1) \\ \vdots \\ v(N) \end{bmatrix} \quad (15)$$

$$\underline{y} \equiv G\underline{c} + \underline{v},$$

where $g_i$ is an (N×1) vector whose n-th element is $g_i(n)=r_i(n)*s(n)$. Recall that "*" represents discrete-time convolution.

From equation (15), it can be seen that the receive signal vector $\underline{y}$ is a linear function of the unknown fading rays, $\underline{c}$, plus noise. Therefore, standard linear estimation techniques (e.g. H. Van Trees, "Detection, Estimation, and Modulation Theory, Part 1", 1968) can be used to estimate $\underline{c}$ based on observations of $\underline{y}$ and based on knowing the transmitted sequence s(n). Note that matrix G can be formed from the knowledge of s(n)'s since, $r_i(n)$'s are known (see the line after equation (11)).

As an example, the Maximum-Likelihood estimate of $\underline{c}$, denoted by $\hat{\underline{c}}^{ML}$ is given by:

$$\hat{\underline{c}}^{ML} = (G^H G)^{-1} G^H \underline{y}, \quad (16)$$

and the corresponding ML estimate of the effective baseband channel $h_0(n)$ is $$\hat{h}_0^{ML}(n) = \sum_i r_i(n) \hat{c}^{ML}(i). \quad (17)$$

If the rays of the channel medium, c(k)'s, vary over time, the effective baseband channel will vary over time. If this variation is significant over the equalization window, it will become necessary to continuously track the variations of the effective baseband channel. In this section, the effective baseband channel is indirectly tracked by first tracking the fading rays of the channel medium, and then forming the tracked values of the effective baseband channel from the tracked values of the rays of the channel medium.

Let c(k, n) represent the value of the medium ray with delay "kT" at time "nMT". Let $h_0(l, n)$ represent the impulse response of the corresponding effective baseband channel at time "nMT".

Various standard tracking algorithms (e.g., Recursive Least Squares (RLS), Least Mean Square (LMS), Normalized Least Mean Square (NLMS), Kalman Tracker, Kalman LMS Tracker, etc.) can be used to recursively estimate (or track) c(k, n). Let $\hat{c}(k, n)$ represent the tracked value of c(k, n). The corresponding tracked value for the effective baseband channel, according to the current invention, is $$\hat{h}_0(l, n) = \sum_i r_i(l) \hat{c}(i, n). \quad (18)$$

In order to utilize the disclosed method, the position of the medium rays (i.e., the value of k's for which c(k, n)'s are non-zero) must first be determined. The present invention does not relate to how these delays are determined, but rather the estimation of the value of c(k, n) once it is known that c(k, n) is not zero for a particular k. Another way to state this problem is to say that first the position of the non-zero medium rays must be found.

In most communication systems, the transmitted symbols are grouped into blocks, and each block contains a few known symbols. These known symbols are sometimes referred to as the "preamble", "midamble", or "training sequence". Given the training sequence, many methods can be used to determine the position of the non-zero delays. As an example, consider determining the best positions for placing three rays of the medium channel. One iterative algorithm for placing these three rays is as follows. First, the best position for placing just one ray is found. Next, with the position of the first ray fixed, the best position for placing the second ray is found. During the search for the position of the second ray, the position of the first ray is fixed, but the value of the first ray is allowed to vary. Finally, with the position of the first and second rays fixed, the best position for placing the third ray is found. During the search for the position of the third ray, the position of the first ray and the position of the second ray are fixed, but the value of the first and the value of the second ray are allowed to vary. This procedure can easily be generalized to more than three rays.

Figure 4:
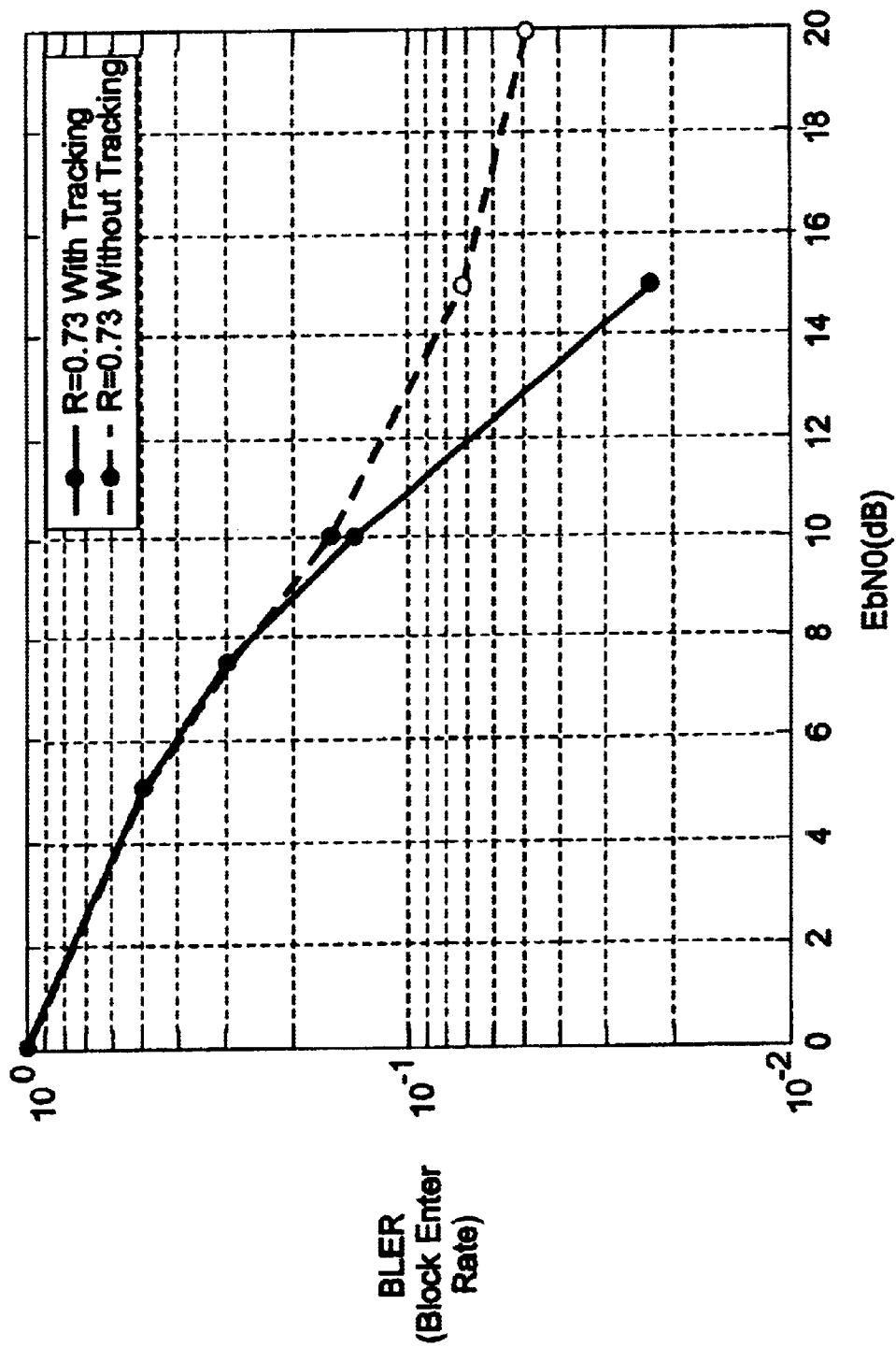
FIG. 4 is a curve illustrating simulation results comparing a tracking equalizer to a non-tracking equalizer.

FIG. 4 shows performance of a tracking equalizer in accordance with the invention, and a non-tracking equalizer at 120 kilometers/hour based on GMSK modulation at symbol rate of 13 MHZ/48 and for a $$\frac{E_b}{N_0}$$

dominated environment. The solid line represents the tracking equalizer and the dashed line represents a non-tracking equalizer. The non-tracking equalizer estimates the channel of the midamble, and uses this channel estimate for demodulating the entire burst using a five-tap MLSE equalizer.

From FIG. 4, it can be seen that with coding rate 0.73, the non-tracking equalizer requires about 4 dB more $$\frac{E_b}{N_0}$$

to achieve 10% BLER compared to the tracking equalizer.

Figure 5:
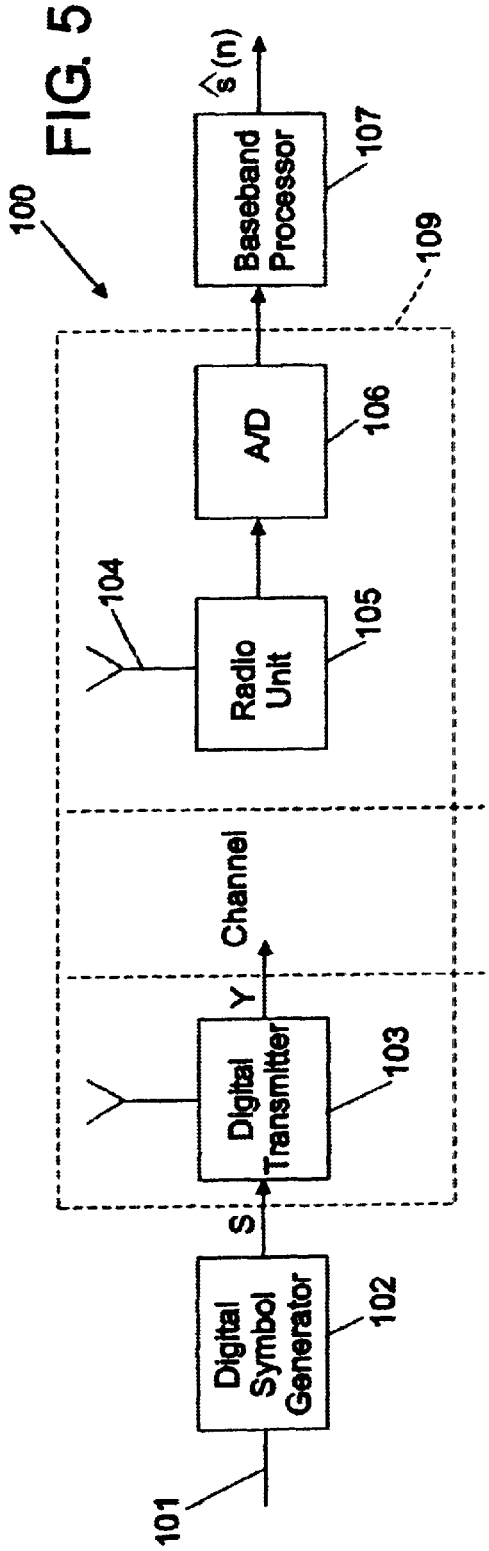
FIG. 5 is a block diagram of a digital communication system including a baseband processor utilizing the method according to the invention.

Referring to FIG. 5, a block diagram of a hardware implementation of a radio communication system is illustrated. A signal to be transmitted is delivered on a line 101 to a digital symbol generator 102. The symbol generator 102 develops the transmitted symbols s(n) which are supplied to a digital transmitter 103. The transmitter 103 transmits the symbols via a channel medium, where they are received by an antenna 104 of a radio unit 105. The radio unit 105 filters and amplifies signals and converts them to a suitable form for processing. The signals may be represented by analog samples that are provided to an analog-to-digital converter 106, which outputs digital samples for processing by a baseband processor 107. The baseband processor 107 produces the estimated symbols ŝ(n). In the system 100, a transmission function 109 is represented to include the transmitter 103, the channel, the radio unit 105 and the A/D converter 106.

Figure 6:
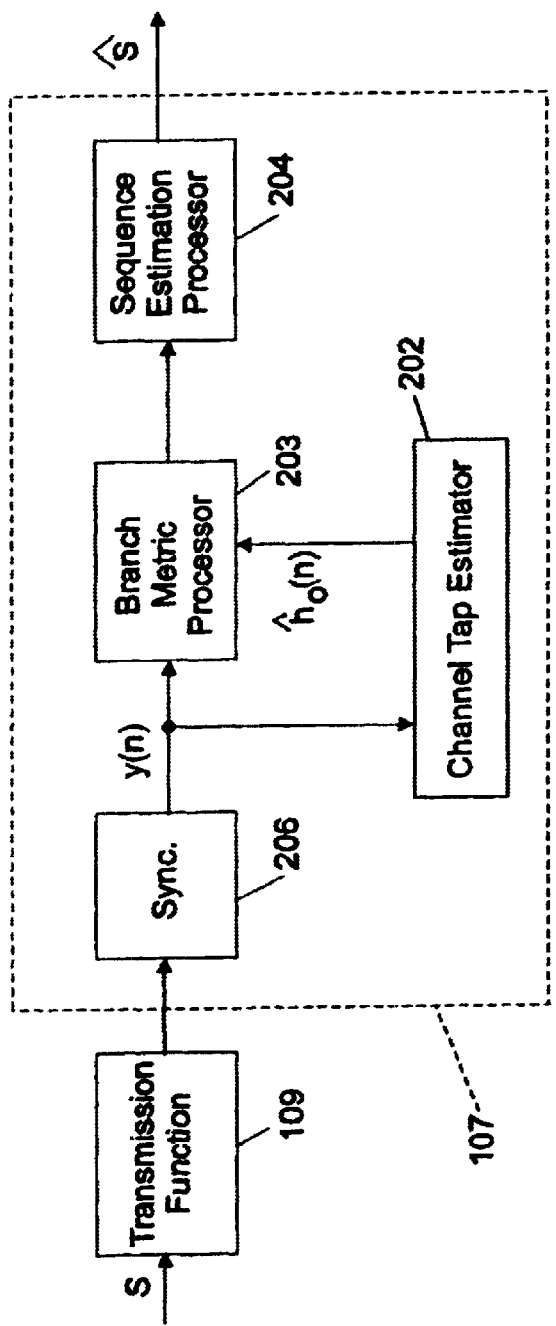
FIG. 6 is a block diagram of the baseband processor of FIG. 5.

Referring to FIG. 6, the baseband processor 107 according to the invention is illustrated. The baseband processor 107 receives signals from the transmission function 109 at a synchronization block 206. The output of the synchronization block 206 corresponds to the signal y(n) shown in FIG. 1, above. The synchronization block 206 is coupled to a channel tap estimator 202 and a branch metric processor 203. The channel tap estimator 202 receives the values y(n) and develops an estimate of $h_0(n)$ which is denoted by $\hat{h}_0(n)$ that is also input to the branch metric processor 203. The branch metric processor 203 is connected to a sequence estimation processor 204. The processors 203 and 204, in the illustrated embodiment of the invention, implement a Viterbi equalizer function utilizing the digital samples and the channel tap estimates for determining the estimated symbols $\hat{s}(n)$.

As will be appreciated by one of ordinary skill in the art, the present invention may be embodied as methods or devices. Accordingly, the present invention may take the form of an entirely hardware embodiment, and entirely software embodiment, or an embodiment combining hardware and software aspects. The present invention has been described with respect to the block diagram illustrations and various equations. It should be understood that each block of the block diagram or combinations of blocks can be implemented by computer program instructions. These program instructions, which represent steps, may be provided to a processor to produce a machine. Likewise, the equations identified herein can be implemented similarly by computer program instructions.

Accordingly, blocks of the block diagram and the defined equations support combinations of means for producing the specified functions and combinations of steps for performing the specified functions. It will be understood that each block and combination of blocks can be implemented by special purpose hardware-based systems which perform the specified functions or steps, or combinations of special purpose hardware and computer instructions.

Thus, in accordance with the invention there is described a novel method for symbol-spaced tracking of a fractionally-spaced fading radio channel.

I claim:

1. A method of estimating symbol spaced time varying radio channels on a channel medium, comprising:

receiving signals transmitted over the channel medium and converting the signals to digital samples for processing;

determining positions of rays of the channel medium, wherein the rays of the channel medium are spaced closer than a transmit symbol period;

recursively estimating jointly values of all rays of the channel medium using the digital samples; and calculating radio channel estimates of the symbol spaced time varying radio channels using transmit and receive filter responses and the determined position and the estimated values of the rays of the channel medium.

2. The method of claim 1 wherein the radio channel estimates are provided for a GSM equalizer.

3. The method of claim 1 wherein the radio channel estimates are provided for a code-division multiple access rake receiver.

4. The method of claim 1 wherein the channel medium varies over time.

5. A channel estimator adapted to estimate symbol spaced time varying radio channels on a channel medium, comprising:

means for receiving signals transmitted over the channel medium and converting the signals to digital samples for processing;

means for determining positions of rays of the channel medium, wherein the rays of the channel medium are spaced closer than a transmit symbol period;

means for recursively estimating jointly values of all rays of the channel medium using the digital samples; and means for calculating radio channel estimates of the symbol spaced time varying radio channels using transmit and receive filter responses and the determined position and the estimated values of the rays of the channel medium.

6. The channel estimator of claim 5 wherein the radio channel estimates are provided for a GSM equalizer.

7. The channel estimator of claim 5 wherein the radio channel estimates are provided for a code-division multiple access rake receiver.

8. The channel estimator of claim 5 wherein the channel medium varies over time.

* * * * *